I. PULVERMAN.
TIRE GAUGE.
APPLICATION FILED MAY 29, 1920.
1,405,436. Patented Feb. 7, 1922.
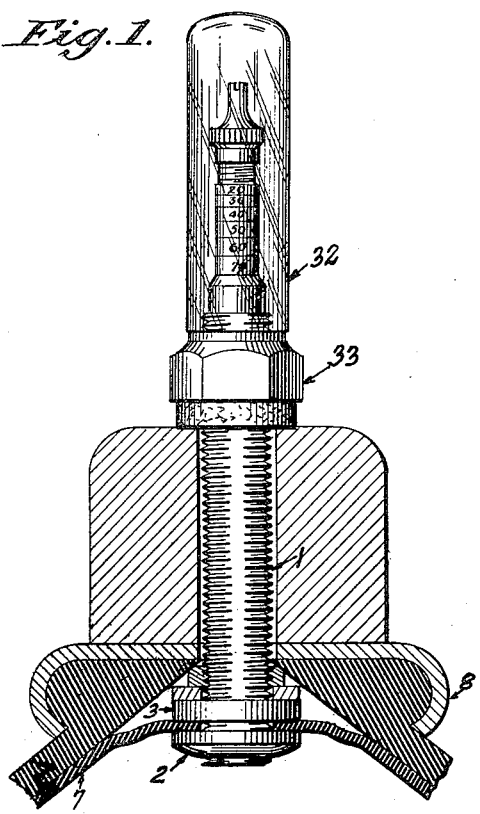
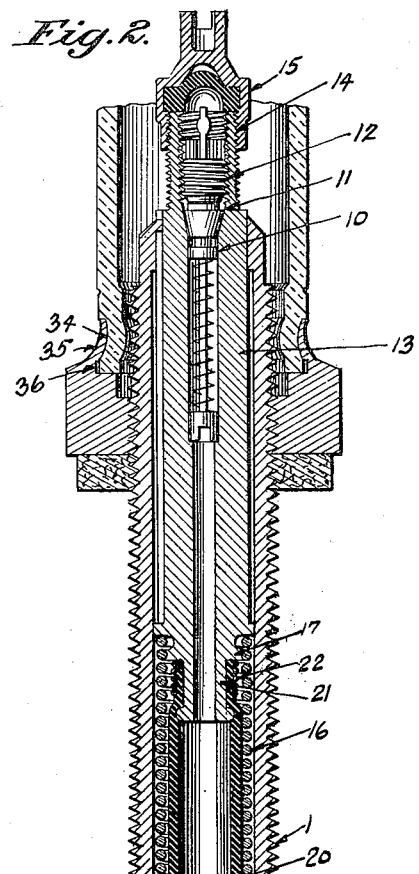
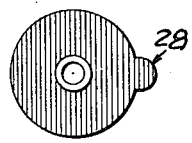
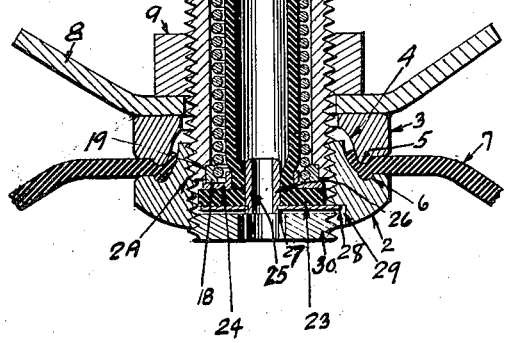
Inventor:
Isidore Pulverman
By T. R. L.
Atty.

UNITED STATES PATENT OFFICE.

ISIDORE PULVERMAN, OF WARREN, PENNSYLVANIA.

TIRE GAUGE.

1,405,436. Specification of Letters Patent. Patented Feb. 7, 1922.

Application filed May 29, 1920. Serial No. 385,315.

*To all whom it may concern:*

Be it known that I, ISIDORE PULVERMAN, a citizen of the United States, residing at Warren, in the county of Warren and State of Pennsylvania, have invented new and useful Improvements in Tire Gauges, of which the following is a specification.

This invention relates particularly to structural features of a tire pressure gauge adding to the durability and strength of the completed device and convenience in manufacture.

The invention is illustrated in the accompanying drawings as follows:—

Fig. 1 shows an elevation of the device in a section of rim and tire.

Fig. 2 a central section of the device somewhat enlarged from Fig. 1.

Fig. 3 a plan view of a flanged nipple for expanding the lower end of the expansion tube.

1 marks the stem. This is a hollow stem extending from the tire tube out through the felloe of the wheel and on which the inflation valve is mounted. In the present construction this stem is screw-threaded from end to end with a continuous screw thread thus very much simplifying the manufacture of the stem. A head 2 has a screw-threaded opening 2ª extending through it of a diameter and pitch to screw on to the threads on the stem 1. A clamping washer 3 is adapted to engage the tube 7, the washer having an annular groove 4 to receive the edges of the opening through the tube and the washer and head having a tongue 5 and groove 6 respectively for making a more secure joint between the stem or head and the tube. The usual supporting plate is provided back of the washer 3 and a clamping nut is arranged on the screw threads of the stem clamping the plate 8 and washer 3 in position. An inflation valve 10 is arranged in a removable seat 11 of ordinary construction and is secured in place with a screw end 12 operating in the screw-threaded end 14 of a plunger 13. The usual cap 15 is provided.

The plunger 13 as it moves outwardly in the stem 1 is designed to indicate the pressure within the tube. Broadly this movable plunger is not new. A spring 16 is secured to a threaded end 17 on the plunger. The opposite end of the spring is screwed into an anchor plate 18. The anchor plate is slightly larger than the interior chamber of the stem 1 and fits into a socket 19 in the end of the stem. A rubber tube 20 is secured to a reduced end 21 on the plunger 13 by means of a wrapping 22. The inner end of the tube 20 has a flange 23 which extends outwardly to a socket formed at the end of the stem 1 in the opening 2ª in the head 2.

The anchor plate with its spring end insertion forms a cutting corner. In order to protect the rubber at the junction of the flange and tube a flanged nipple 24 is provided which has a tubular extension along the rubber tube to a point within the spring 20 and an outwardly extending flange on which the rubber flange at the end of the tube rests. This flanged nipple protects the rubber and prevents its cutting at the point of juncture between the flange and tube. It will be understood that this point is under strain as the rubber tube is expanded with a movement of the plunger and that it is difficult to avoid cutting the edges on the inserted spring.

It is desirable to have the flange 23 at the end of the tube of sufficient thickness and size to seal the openings at the end of the stem. With this thickness there is a tendency for the rubber to expand inwardly and close the opening to the tube. Further it is desirable to have the flange expand outwardly so as to make a forced or pressed closure at its outer periphery. To accomplish this I provide a nipple 25 which extends upwardly into an opening 26 through the flange 23 and into the tube 20. The nipple has an extending flange 27 which forms a washer extending over the surface of the flange 23, the washer having a key projection 28 extending into a socket 29 in the head so as to prevent the turning of the washer with its engagement with a screw 30 screwed into the screw-threaded opening 2ª in the end of the head. It will be readily seen that as pressure is put on the flange 23 through the action of the clamping screw 30 the flange 23 is prevented from expanding inwardly and closing the opening and expands outwardly making a closure with the walls of the socket so as to seal the entire device. The screw 30 has an opening 31 which communicating with the nipple 25 makes a connection through to the interior of the tube 20 and the plunger 13 has an opening leading to the inflation valve in the usual manner.

I prefer to provide the usual transparent cap 32 which is preferably formed of glass and arranged in a base 33. The base is provided with a socket 34 with an upstanding thin lip 35. The glass is arranged in this socket and provided with a groove 36. The upstanding lip 35 is spun into this groove 36 so as to secure the glass to the base. The socket 34 is of slightly larger diameter than the glass at the base so that there is a space left between the bottom of the socket and the outer periphery of the glass at the base. In this way the glass is subjected to the pressure of the thin lip only and consequently injury to the glass through expansion and contraction of the metal of the base is avoided.

What I claim as new is:—

1. In a tire gauge, the combination of a hollow stem having its exterior screw-threaded, the screw threads being extended throughout the major portion of the stem and to the inner end thereof; a head screwed on to the inner end of the stem; means for clamping a tire tube on the head; a plunger in the stem; an inflation valve in the plunger; a spring secured to the plunger and at the inner end of the stem; an elastic tube secured to the plunger and having a flange positioned in the head at the end of the stem; and a screw in the head clamping the flange.

2. In a tire gauge, the combination of a hollow stem having its exterior screw-threaded, the screw threads being continued throughout the major portion of the length of the stem and to the inner end thereof; a head having a screw-threaded opening therethrough of uniform diameter screwed on to the inner end of the stem; means for clamping a tire tube on the head; a plunger in the stem; an inflation valve in the plunger; a spring secured to the plunger and at the inner end of the stem; an elastic tube secured to the plunger and having a flange positioned in the head at the end of the stem; and a screw in the head clamping the flange.

3. In a tire gauge, the combination of a hollow stem having its exterior screw-threaded, the screw threads being extended throughout the major portion of the stem and to the inner end thereof; a head screwed on to the inner end of the stem; means for clamping a tire tube on the head; a plunger in the stem; an inflation valve in the plunger; a spring secured to the plunger and at the inner end of the stem; an elastic tube secured to the plunger and having a flange positioned in the head at the end of the stem; a screw in the head clamping the flange; and a flanged nipple extending into the tube maintaining the opening into the tube and compelling an outward expansion of the flange.

4. In a tire gauge, the combination of a stem having a head with a socket at its inner end; a plunger arranged in the stem; an inflation valve in the plunger; an elastic tube secured to the plunger and having a flange extending into the socket; a flanged nipple extending into the inner end of the tube, the flange of the nipple engaging the flange of the tube; and means for clamping the flange of the nipple against the flange of the tube.

5. In a tire gauge, the combination of a stem having a head with a socket at its inner end; a plunger arranged in the stem; an inflation valve in the plunger; an elastic tube secured to the plunger and having a flange extending into the socket; a flanged nipple extending into the inner end of the tube, the flange of the nipple engaging the flange of the tube; means for clamping the flange of the nipple against the flange of the tube; and means for locking the flanged nipple against turning.

6. In a tire gauge, the combination of a stem having a head at its inner end; a plunger in the stem; a spring secured to the plunger; an anchor plate into which the inner end of the spring extends; an elastic tube secured to the plunger and arranged within the spring and having a flange at its inner end extending laterally past the anchor plate; and a flanged nipple on the tube between the anchor plate and the flange on the tube.

7. In a tire gauge, the combination of a hollow stem having its exterior screw-threaded, the screw threads being extended throughout the major portion of the stem and to the inner end thereof; a head having a screw-threaded opening through it, said stem being screwed partially through the head leaving a screw threaded socket; means for clamping a tire tube to the head; a plunger in the stem; an inflation valve in the plunger; an elastic tube secured to the plunger; and means for securing the inner end of the tube, said means extending into said socket and comprising a nut screwed into the threads of said socket.

In testimony whereof I have hereunto set my hand.

I. PULVERMAN.